Aug. 16, 1966 J. COHEN ETAL 3,266,304
VISIBLE VALVE STEM CAP AIR GAUGE
Filed Jan. 17, 1964
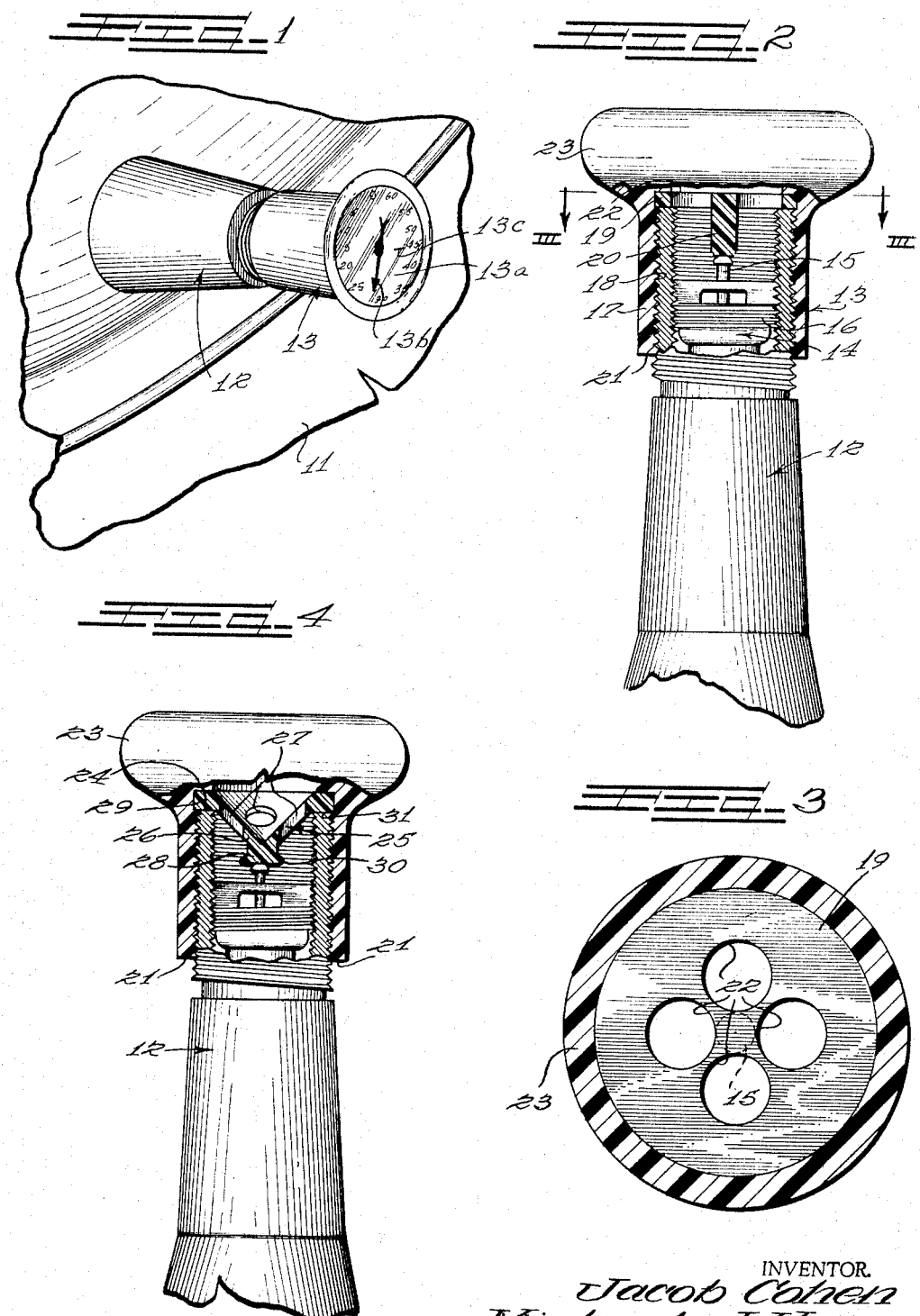
INVENTOR.
Jacob Cohen
Michael J. Kane
ATTORNEYS

United States Patent Office 3,266,304
Patented August 16, 1966

3,266,304
VISIBLE VALVE STEM CAP AIR GAUGE
Jacob Cohen, 1637 W. Chase Ave., Chicago 26, Ill., and
Michael J. Kane, 5220 S. Emerald St., Chicago, Ill.
Filed Jan. 17, 1964, Ser. No. 338,468
1 Claim. (Cl. 73—146.8)

This invention generally relates to a pressure gauge and more particularly relates to a valve stem cap pressure gauge.

Presently, the air pressure of vehicle tires is checked by utilizing a pressure gauge which is separate and apart from the tires. This type of air pressure gauge requires the motorist to remove the valve stem cap from each tire and to spend a certain amount of time in individually checking each tire. During the checking of a tire it is a common occurrence for the gauge and valve stem to be misaligned and thus have air escape from the tire. The pressure then can only be replaced by taking the tire to a filling station or other similar location where an air pump is located. Also, the tire pressure may be checked by a gas station attendant or at a gas station by the motorist when he desires to do such by utilizing the well known air pump pressure gauge. As a result of this time and tedious effort involved in checking the pressure of vehicle tires, motorists do not make such a check as frequently as they should and as a result the tires are improperly inflated which can cause premature wear of the tires as well as inefficient operation of the vehicle.

The present invention eliminates these problems by providing a pressure gauge for each vehicle tire which is mounted on each tire and requires only a glance to determine the pressure of each tire.

Therefore, it is an object of the present invention to provide an improved vehicle tire pressure gauge.

It is another object of the present invention to provide a pressure gauge which is adapted to be mounted on a vehicle tire and maintained thereon during the operation of said vehicle tire to provide a reading of the tire pressure at a glance.

It is another object of the present invention to provide a valve stem cap having a pressure gauge.

It is another object of the present invention to provide a tire valve stem with a removable pressure gauge connected thereto.

It is another object of the present invention to provide a valve stem cap having a depression rod extending therein from a support means mounted therein and having a plurality of ports leading to a pressure gauge extending from one end of the valve stem cap and said depression rod being mounted such that it will contact one end of a valve rod mounted within the valve stem.

Other features, objects and advantages of the present invention will become apparent to those skilled in the art after a careful consideration of the following description when taken in conjunction with the accompanying drawing wherein like reference numerals refer to like in corresponding parts.

In the drawing:

FIGURE 1 is a partial elevational view illustrating a tire having a pressure gauge constructed in accordance with the principles of the present invention;

FIGURE 2 is a partial longitudinal cross-sectional view with parts in elevation illustrating a pressure gauge constructed in accordance with the principles of the present invention;

FIGURE 3 is an enlarged cross-sectional view of the pressure gauge of the present invention taken along lines III—III of FIGURE 2; and FIGURE 4 is a partial longitudinal cross-sectional view with parts in elevation illustrating another embodiment of a pressure gauge constructed in accordance with the principles of the present invention.

As shown in the drawing:

A pressure gauge constructed in accordance with the principles of the present invention has a gauge extending the normally closed end of a tire valve stem cap. Extending concentrically within the valve stem cap and mounted to the interior thereof is a support means having a depression rod extending away from the pressure gauge and along the axis of the valve stem cap and means to permit the passage of air through the support means and into the gauge. Therefore, when the valve stem cap gauge is screwed onto a valve stem, the depression rod contacts the valve rod to depress the valve rod and open the valve stem valve to allow the air from within the tire to pass through the valve stem valve into the valve stem cap gauge and register said pressure on the gauge. The valve stem cap gauge is maintained on the valve stem in the same manner as present valve stem caps. Therefore, when the motorist desires to check the air pressure of his vehicle tire he merely has to look at the gauge on the valve stem cap to read said pressure. Also, if he desires to release a slight amount of air from his tires he may do so by slightly turning the valve stem cap to allow the air to be released from the tire to the atmosphere as will be described in greater detail hereinafter.

Referring to FIGURE 1 there is illustrated a vehicle tire 11 having a valve stem 12 with a valve stem cap gauge 13 threadedly secured thereto. The cap gauge 13 has a calibrated face 13a forming one end of the gauge. An indicator 13b is connected to the face 13a and is adjusted to indicate the air pressure of the vehicle tire 11. The calibrated face and indicator are suitably protected by a suitable transparent cover 13c.

Referring to FIGURES 1–3, the valve stem 12 is a well known type of valve stem utilized for both the tubeless type and the tube type vehicle tires. The valve stem has a valve means 14 threaded therein. The valve means 14 has a valve rod 15 for actuating a valve (not shown). When the valve rod 15 is depressed the valve is opened to allow air to pass from the tire through the valve stem. The valve is maintained in a normally closed position by well known suitable means and is returned to its closed position when the valve rod is not depressed by a positive force.

Threadedly secured to the threaded end 16 of the valve stem 12 is the cap gauge 13 having a tubular wall 17 internally threaded at 18. Mounted within the cylindrical wall 17 is a cylindrical support member 19 having integrally extending from the outer end face thereof a depression rod 20 which extends along the axis of the tubular housing 19 towards the open annular end 21 thereof. The length of the depression rod 20 is predetermined such that, as is illustrated in FIGURE 2, when the valve stem cap gauge 16 is screwed onto the valve stem, the depression rod 20 will contact the valve rod 15 and depress the valve rod 15 to open the valve. The support 19 has a plurality of ports 22 that allow the air released from the tire 11 to pass through the valve stem 12 and through the ports 22 into a pressure gauge 23 integrally extending from the other end of the tubular wall 17. The pressure gauge 23 may be any of the known type mechanical or diaphragm pressure gauges wherein the pressure exerted therein will be translated to the indicator 13b which is read through the transparent sightglass 13c.

The support 19, as illustrated in FIGURE 2, may be fixedly secured to the inner walls of the tubular housing 17 or may be allowed to have slight axial movement therein and with said movement being confined by one end of the threads 18 and the pressure gauge. Also, the support member 19 may be made integral with the gauge or cap wall 17 if desired. The support member is preferably constructed from a suitable plastic such that when the valve stem cap gauge is screwed onto the valve stem and is in closed position, the valve stem annular end wall 24, will sealingly abut against the support member outer end face to provide a seal means to prevent the escape of air therepast and into the atmosphere.

Referring to FIGURE 4, there is illustrated another embodiment of the present invention wherein the cap gauge 13 has support 25 with a hollow conical wall 26 having a plurality of ports 27 therethrough and having a depression rod 28 axially extending from the apex end thereof and a flange 29 radially extending from the base end thereof. The support 25 is mounted within the valve cap in a similar manner as the support 19 with the depression rod 28 extending towards the open annular end 21. The depression rod 28 has an enlarged head 30. The enlarged head 30 allows the depression rod to contact the valve rod 15 in cases where the valve rod 15 may be misaligned with the axis of the valve stem 12 or vice versa the depression rod 28 being misaligned with the valve stem axis.

In this embodiment, the annular flange 29 is adapted to have its outer annular face 31 engage the annular end 24 of the valve stem to provide sealing engagement therewith. When it is desired to release a small amount of air from the tire, the valve stem cap gauge may be unscrewed slightly such that the annular end wall 24 of the valve stem is separated from the outer face 31 such that sealing engagement therewith is broken. Thus, air is allowed to pass between the valve stem 12 and the tubular wall 17 into the atmosphere.

It is of course understood that support means other than the hollow conical support 26 and the cylindrical support 19 may be utilized such as spider or sprocket type supports for the depression rods 15 and 28 and also, that the sealing means for the cap gauge may be provided by means other than the support means i.e. a sealing ring, an annular shoulder radially extending from the wall 17, etc.

It is of course understood that the above embodiments of my present invention are for illustrative purposes only and that modifications may be made without departing from the inventive concepts of the present invention and that we intend the scope of the present invention to be set forth by the hereunto appended claim.

We claim as our invention:

In combination, a tubular valve stem for a pneumatic tire, said stem having an open end and being internally and externally threaded, normally closed valve means threadedly secured within said valve stem and having a depressible valve rod to open said valve means, a valve stem cap having internal threads threadedly received over the open end of said stem and pressure gauge means within said valve stem cap, the improvement in the valve stem cap comprising, an annular shoulder formed in said cap, a plate member formed of plastic having an annular rim abutting on one side against said shoulder, the other side thereof adapted to seat against the top of said valve stem and seal the same against the escape of air when said cap is tightened, a valve rod actuator depending from the center of said plate and adapted to engage and force said valve rod downward when said cap is tightened, and at least one opening in said plate to allow air to pass from said valve means to said pressure gauge means, slight unscrewing of said valve cap causing partial closing of said valve means and upward movement of said annular shoulder, thereby permitting air from the tire to displace said plate rim from sealing engagement with said stem and to escape into the atmosphere.

References Cited by the Examiner
UNITED STATES PATENTS

| | | | |
|---|---|---|---|
| 2,225,674 | 12/1940 | West | 73—146.2 X |
| 2,329,039 | 9/1943 | Fenwick | 73—146.8 |
| 2,842,087 | 7/1958 | Burns | 73—146.8 X |
| 2,948,256 | 8/1960 | Tapp | 73—146.8 X |

LOUIS R. PRINCE, *Primary Examiner.*

D. O. WOODIEL, *Assistant Examiner.*